B. H. URSCHEL.
UNIVERSAL JOINT.
APPLICATION FILED OCT. 8, 1917.
1,273,289.
Patented July 23, 1918.
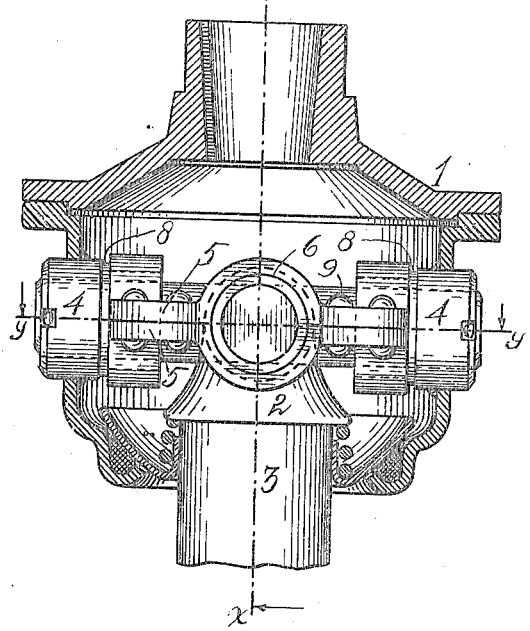
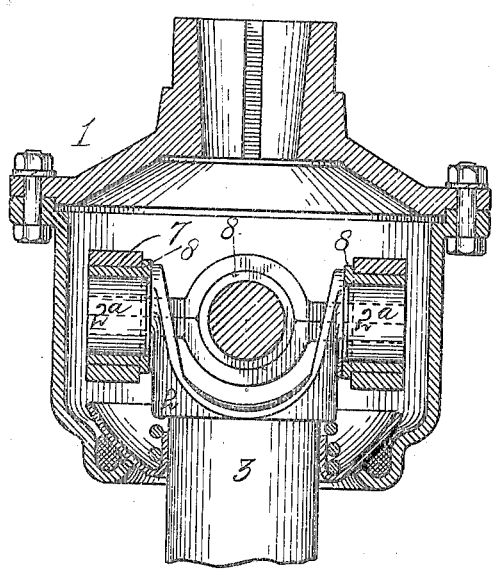
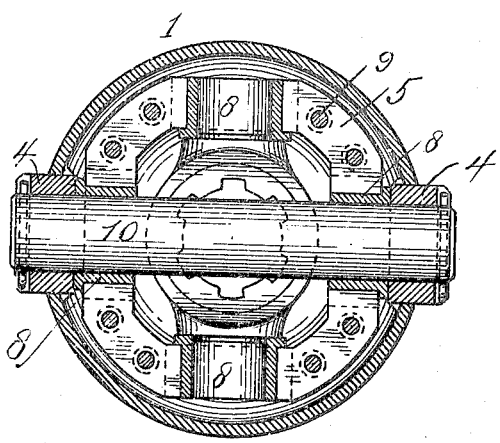
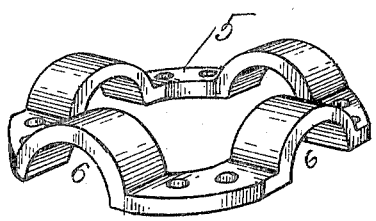
INVENTOR:
Bertis H. Urschel.
By Munson Hall, Atty.

UNITED STATES PATENT OFFICE.

BERTIS H. URSCHEL, OF BOWLING GREEN, OHIO, ASSIGNOR TO THE UNIVERSAL MACHINE COMPANY, OF BOWLING GREEN, OHIO, A CORPORATION.

UNIVERSAL JOINT.

1,273,289. Specification of Letters Patent. Patented July 23, 1918.

Application filed October 8, 1917. Serial No. 195,214.

*To all whom it may concern:*

Be it known that I, BERTIS H. URSCHEL, a citizen of the United States, residing at Bowling Green, in the county of Wood and State of Ohio, have invented certain new and useful Improvements in Universal Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a universal joint, and more particularly, to the journals and bearings which permit the movement, angularly to each other, of the driving and the driven shafts, and in which the bifurcated adjacent ends or yokes of two shafts are journaled in bearings disposed in the same plane and at a right angle to each other. Heretofore in certain universal joints of this kind the member which carries these bearings consists of two ring-parts having their meeting faces secured together to form a ring, each of the ring-parts having four depressions which register with like depressions in the companion ring-part, forming circular holes for the reception of suitable bushings. These ring parts have heretofore been produced by the slow and expensive method of forging and machining. One of the objects of my invention is to overcome the difficulty here indicated by constructing the ring of a pair of like metal parts stamped in suitable dies to exactly the required form, thus dispensing with the necessity for the expensive and extremely accurate machining heretofore required.

In universal joints of the character described the holes in the two-part rings which furnish the bearings for the yokes of the companion shafts are supplied with steel bushings hardened to resist wear. It has heretofore been necessary to secure these bushings in place by means of pins, set-screws, cotters or the like, requiring an objectionable multiplicity of parts. A further object of my invention is to overcome this difficulty by the novel construction and arrangement of the bushings and their associated parts hereinafter described.

To these ends my invention consists of the devices, construction and arrangement of parts hereinafter described, and illustrated in the accompanying drawings, in which—

Figure 1 is a side-elevation of my universal joint with half the shell or casing disclosed in central longitudinal section; Fig. 2, the same seen at a right-angle to the view in Fig. 1, and taken on line *x—x*; Fig. 3, a sectional plan-view taken on line *y—y*, Fig. 1, and Fig. 4, a perspective view of one of my ring-parts hereinafter referred to.

Like numerals of reference indicate like parts throughout the drawings.

In the drawings, 1 is a two-part shell of the usual or any preferred construction, the parts being flanged at their meeting edges and secured together by bolts or screws. Through each of the shell parts is a shaft-opening one being for the driving-shaft the other being for the driven shaft. These openings are provided with suitable devices for preventing the escape of lubricant and the access of dust, which, forming no part of the present invention, need not be here described. 2—2 is the yoke formed at the bifurcated end of shaft 3, which may be considered as the driving shaft. 4—4 indicate rings rigidly fixed in opposed openings on the shell, which shell may be considered as a yoke for the driven shaft. 5—5 are a pair of like ring-parts stamped to exactly the required form in suitable dies. Each of the ring-parts has semi-circular depressions 6 which, when the two ring-parts are brought together face to face, register with each other and form two pairs of equi-distant holes 7 for the reception of bearing-bushings 8. These ring-parts, shown in plan-view in Fig. 3 and in perspective in Fig. 4, are essentially circular in outline but have four straight sides in which are formed the depressions 6. The ring-parts being securely fastened together by bolts or rivets 9 passing through registering holes which are accurately spaced in the stamping operation, the pairs of shaft-openings 7 are now in exact axial alinement. Two of the bushings 8, the bearing surfaces of which are hardened and highly polished, are closely fitted into two of the opposed holes 7 with their flanges resting against the inner side of the ring, and two other bushings are in like manner closely fitted into the other two openings 7 with their flanges pressing against the outer side of the ring, as clearly shown in the drawings. Each of the arms of the yoke 2 carries a gudgeon or trunnion 2ª which fits with a working fit in the bearing formed by two of the opposed bushings, the yoke pressing outwardly against the flanges of the bushings, the bushings being thus held in place without the addition of any further retaining device. A shaft 10 passes through the other pair of bushings, the rings 4 receiving and being secured against rotation to the projecting ends of the shaft. The rings 4 press inwardly upon the flanges of the bushings thus holding the bushings in place without the aid of any additional fastening device. It will be seen that now the driving and driven shafts may be swung at an angle to each other after the usual manner of universal joints.

Having described my invention, what I claim and desire to secure by Letters Patent, is—

1. In a universal joint, a ring having opposed equi-distant radial holes, in each of said holes a flanged bushing, the flanges of one pair of bushings being disposed internally and the flanges of the other pair of bushings being disposed externally of said ring, a driving shaft yoke having its extremities journaled in one pair of said bushings, a shaft extending across said ring and being journaled in the other pair of bushings, a casing forming the driven member of the joint, and means for rigidly securing said casing in operative relation to said cross shaft.

2. In a universal joint, a pair of like ring-parts secured together face to face to form a ring, said parts having opposed coincident semi-circular depressions which together form four holes, and in each of said holes a flanged bushing, two of said opposed bushings having their flanges disposed on the inner side of the ring, the other two bushings having their flanges disposed on the outer side of the ring combined with a shaft-yoke pivoted in the former bushings and a casing pivoted in the latter bushings.

3. In a universal joint, a pair of like ring-parts composed of metal stampings, said parts being secured together face to face to form a ring, said ring-parts having opposed coincident semi-circular depressions which together form four equi-distant radial holes, in each of said holes a flanged bushing, the flanges of one pair of bushings being disposed internally and the flanges of the other pair of bushings being disposed externally of said ring, a driving shaft-yoke having its extremities journaled in one pair of said bushings, and a casing rigidly connected with a cross shaft journaled in the other pair of said bushings.

In testimony whereof I affix my signature in presence of two witnesses.

BERTIS H. URSCHEL.

Witnesses:
 G. F. GOMERSALL,
 REWAL ORDWAY.